L. S. HAYES.
MOTOR PLOW.
APPLICATION FILED MAY 8, 1913.
1,165,097.
Patented Dec. 21, 1915.
2 SHEETS—SHEET 1.
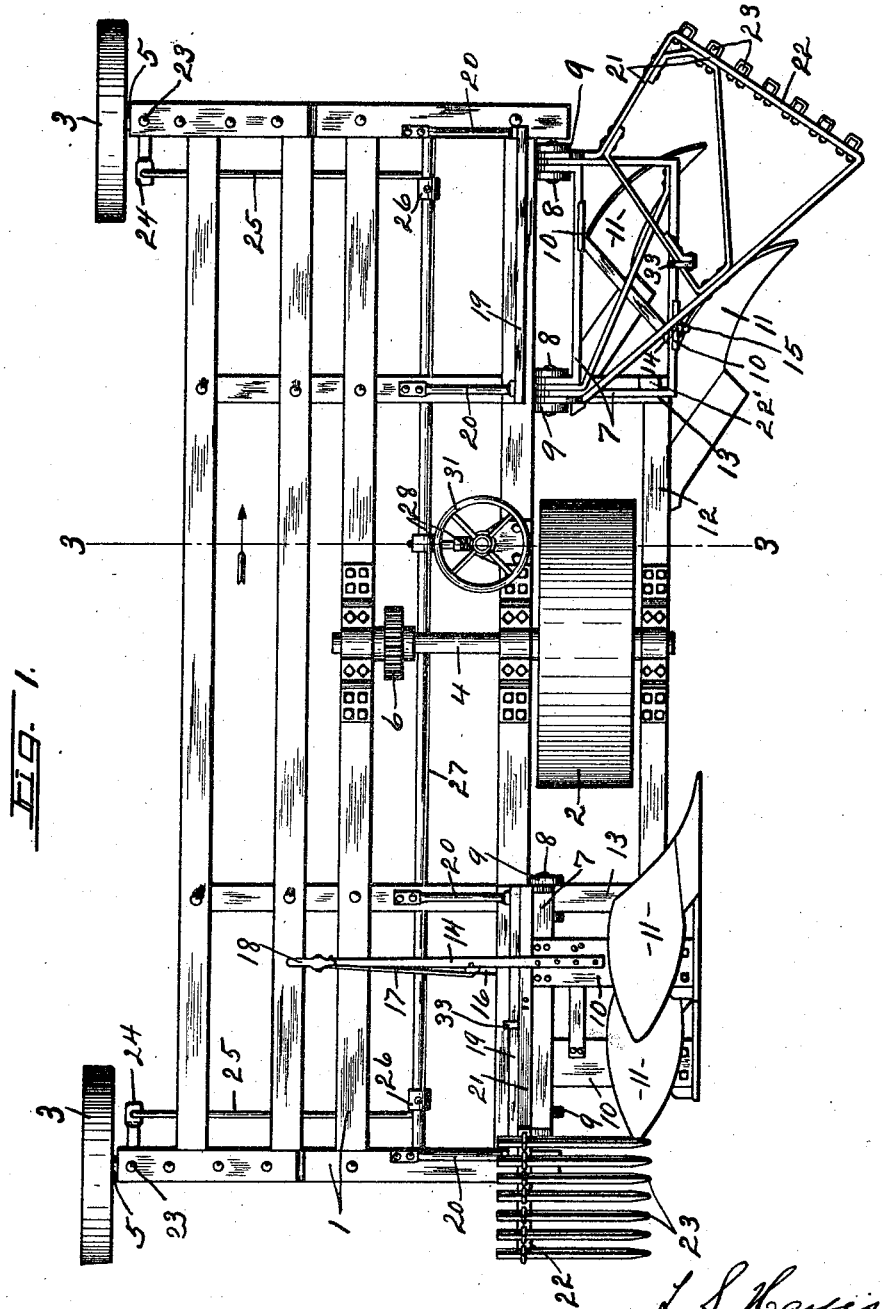
WITNESSES:
INVENTOR.
BY
ATTORNEY.

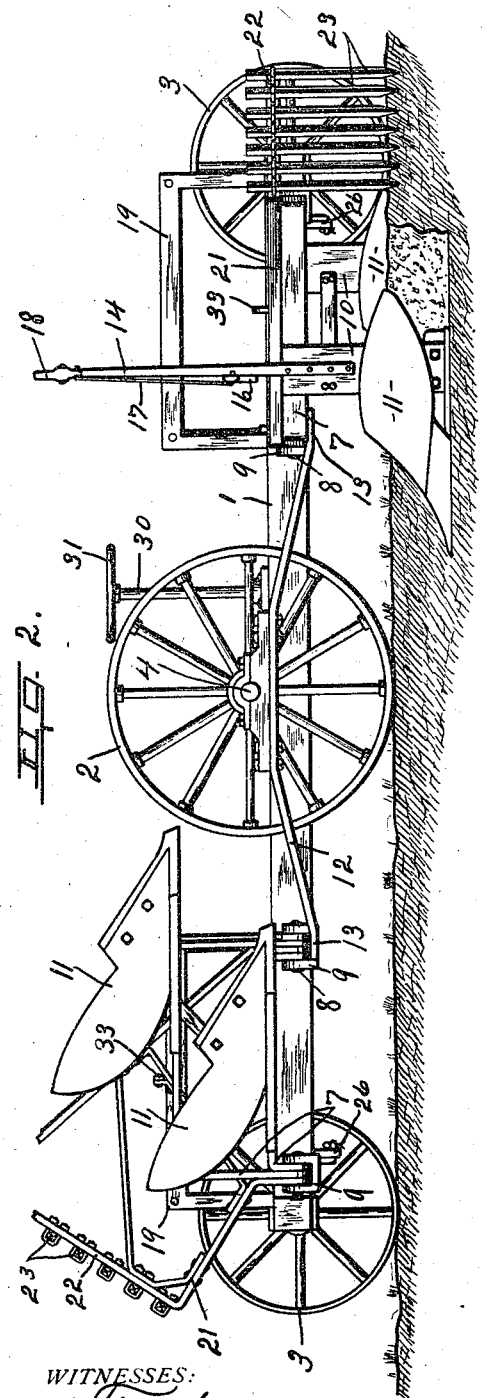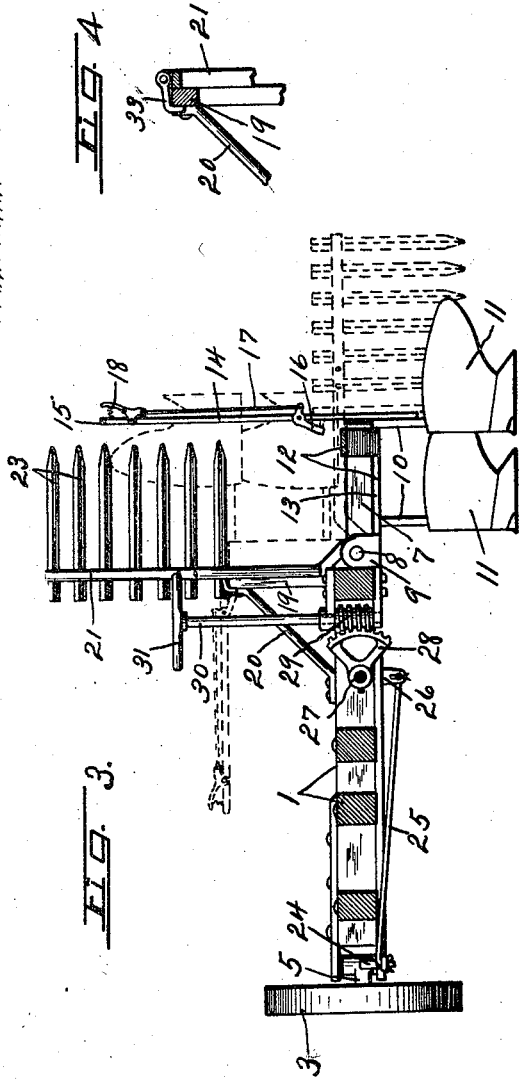

UNITED STATES PATENT OFFICE.

LEWIS S. HAYES, OF CORTLAND, NEW YORK.

MOTOR-PLOW.

1,165,097.  Specification of Letters Patent.  Patented Dec. 21, 1915.

Application filed May 8, 1913. Serial No. 766,416.

*To all whom it may concern:*

Be it known that I, LEWIS S. HAYES, of Cortland, in the county of Cortland, in the State of New York, have invented new and useful Improvements in Motor-Plows, of which the following, taken in connection with the accompanying drawings, is a full, clear, and exact description.

This invention relates to certain improvements in motor-driven plows having a wheel truck adapted to carry any of the well known forms of steam or gas engines or equivalent motors and suitable mechanism for transmitting motion from the motor to one of the traction wheels for propelling the machine in either direction.

The main object is to provide the motor-driven truck with a plurality of plows facing each other and movable independently into and out of their operative positions so that the machine may be driven in either direction for plowing successive furrows without turning the machine around.

Another object is to position the plows and traction wheel in such relation that the traction wheel together with the steering members will always travel upon the solid or unturned ground.

A further object is to utilize the traction wheel as a depth gage for the furrows.

A still further object is to arrange the traction wheel and steering members so as to establish a self-balancing three-point support for the truck.

Another object is to provide means for shifting the steering wheels simultaneously in opposite directions so as to permit short and quick turns when desired.

Other objects are to permit the use of a harrow in connection with the active plow or plows so as to finish the soil for planting simultaneously with the plow and also to support the plows and harrows in such manner as to relieve as far as possible the excessive strains upon their hinged connections with the truck.

Other objects and uses relating to specific parts of the machine will be brought out in the following description.

In the drawings—Figure 1 is a top plan of a motor plow embodying the various features of my invention, except that the motor which may be of any well known construction is omitted. Fig. 2 is a side elevation of the plow shown in Fig. 1. Fig. 3 is a transverse vertical sectional view of the same plow taken on line 3—3, Fig. 1, showing more particularly the manner of raising and lowering each set of plows and the corresponding harrow. Fig. 4 is a detail sectional view of a portion of the harrow frame showing the manner of locking it in its inoperative position.

The plow truck, constituting one of the important features of my invention, comprises a main supporting frame or platform —1—, a traction wheel —2—, and steering wheels —3—, the traction wheel being mounted upon a transverse shaft —4— centrally upon one side of the frame —1— and substantially midway between the ends thereof while the steering wheels —3— are mounted upon axle stubs —5— on the ends of the opposite side of said frame.

The shaft —4— for the traction wheel —2— may be driven by any of the well known forms of internal combustion or steam engines and power transmitting mechanism (not shown) and for this purpose I have provided the shaft with a gear —6— for connection to such motor although it is evident that any other driving member may be employed according to the disposition of the motor on the truck.

The traction wheel —2— may be of any suitable size or construction to afford the necessary gripping power sufficient to propel the entire machine along the surface of the ground when one or the other set of plows is in active position.

It will be observed that the entire frame is underslung below the shaft or axle —4— so as to bring the plow supports and plows in close compact relation to the frame, thereby reducing the strains upon said supports and their connection with the main frame.

Suitable plate-supporting frames —7— are pivoted at —8— to brackets —9— on the same side of the frame —1— at opposite sides of and equi-distant from the axis of the traction wheel —2— so as to swing vertically transversely of the main frame through an arc of substantially 90° to and from a horizontal position, each frame being provided with one or more, in this instance two, pendant brackets —10— for receiving and supporting a corresponding number of plows —11— having specially formed land sides which are rigidly secured directly to the lower ends of their respective brackets. These brackets are rigidly secured to parallel lengthwise bars forming parts of the swinging frames and spaced some distance apart so as to support the plows side by side a distance corresponding to the desired width between adjacent furrows, the outer brackets and corresponding plows being located nearer the traction wheel so as to cause the active plows to travel one in advance of the other and thereby turning the furrows over one upon the other. The inner ends of these vertically movable plow supporting frames overhang the opposite ends of an auxiliary side frame —12— which is secured to the main frame —1— and serves to support the outer end of the shaft —4— at the outer end of the traction wheel while its opposite ends serve as limiting stops or rests —13— for limiting the downward movement of the swinging frames and plows mounted thereon and at the same time permitting free upward movement of the swinging frames and plows when not in use.

The plow supporting frames with the plows thereon may be moved to and from their active positions by any suitable means here shown as consisting of a hand lever —14— having one end rigidly secured to the outer portions of the main supporting frames and adjacent brackets —10— and their opposite ends extended upwardly some distance above their corresponding swinging frames and provided with suitable handles —15— by which they may be manipulated, each lever being provided with a movable detent —16— operable by means of a link —17— and hand piece —18— for engagement with an upstanding flange or bar —19— rising from the main supporting frame, said bar being rigidly held in operative position by braces —20—.

Suitable harrow-supporting frames —21— are also pivotally mounted upon the same pivots —8— as the plow-supporting frames so as to rest thereon when adjusted for use but are capable of independent vertical swinging movement through an arc of substantially 90° to and from a horizontal position and are provided with teeth-supporting bars —22— carrying a series of harrow teeth —23—, the bars and teeth being arranged diagonally to the line of travel with their outer ends foremost so as to level off the furrows as they are made by the plows thus preparing the soil for meadow planting in a single operation of the machine over the surface of the ground, it being understood that each harrow frame is arranged so that its teeth trail on the ground just at the rear of the plows as the machine is propelled forwardly.

It will be observed upon reference to Figs. 1 and 2 that the inner sides of the plow-supporting frames and harrow-supporting frames are hinged between ears or lugs forming parts of the brackets —9— which serve to relieve in a measure the pivots from excessive strains, but in addition to these features, the ends of the auxiliary frame —12— are also provided with forwardly projecting lugs —22'— for engaging the rear face of the front end bar of the plow-supporting frame —7— which may be adjusted for use, said lugs —22'— being located some distance outside of the hinged connection between the swinging frame and main supporting frame so as to draw directly upon the active swinging frame and thereby further relieve the hinges from excessive strains during the plowing operation.

Any suitable mechanism may be provided for operating the steering wheels —3— simultaneously in opposite directions so as to effect short or quick turns and for this purpose, the axle stubs —5— are pivoted at —23— to the adjacent ends of the main supporting frame —1— and are provided with crank arms —24— projecting inwardly toward each other, said crank arms being connected by separate links —25— to additional crank arms —26— on the opposite ends of a longitudinally extending rock shaft —27—. This rock shaft preferably extends from end to end of the main supporting frame and is journaled in suitable bearings therein, the central portion of said rock shaft being provided with a toothed segment —28— which is engaged by an upright worm —29— on the lower end of a vertical steering post —30— having a suitable hand wheel —31— by which the worm may be turned in either direction for operating the toothed segment and thereby transmitting corresponding turning motion to the steering wheels through the medium of the crank arms —26— and —24— and link —25—.

When either plow is used independently of the harrow, the corresponding frame may be held in its inoperative position by means of a separate pawl or detent —33— pivoted to a portion of the harrow frame and adapted to interlock with the stop bar —19— on the main frame —1— in a manner similar to that of the pawl —16— for holding the plow frame in its inoperative position.

It is now clear from the foregoing description and the accompanying drawings that the motor truck is provided with two sets of plows, two harrows and swinging frames therefor movable vertically transversely of the frame about the same axes and that these plow frames and plows are located in approximately the line of travel of the traction wheel and at the same side of the main supporting frame and equidistant from said traction wheel; that the plows of both sets face each other and therefore face the traction wheel which is located approximately midway between the ends of the frame while the steering wheels are located at opposite ends of the machine and at the opposite side of the main frame from that of the traction wheel and equidistant to opposite sides of the axis thereof; that the steering wheels are adjustable simultaneously in opposite directions; that either plow and its corresponding harrow frame may be thrown into and out of position independently of the other plow and its harrow frame and that either harrow frame may be used simultaneously with the corresponding plow or held in its inoperative position as may be desired, thereby permitting the machine to be moved back and forth across the field by simply adjusting one or other of the plows to its operative position and raising the other plow to its inoperative position, the active plow being always at the rear of the traction wheel whereby the traction wheel is always traveling on solid ground.

What I claim is:

1. In a motor plow, a truck having only three ground bearings, all disposed in the same plane, two of said bearings being located at one side in the same line of draft and turnable laterally for steering, the other bearing being a traction wheel located at the opposite side of the machine substantially midway between the steering bearings, plow supporting frames hinged to the truck to swing transversely of the line of draft and extending some distance beyond the outer side of the line of travel of the traction wheel, and plows mounted on said frames to move therewith.

2. In a motor plow, a truck-frame having three ground-wheels constituting its only support and having their ground bearings in the same horizontal plane, two of the wheels being located at the ends of one side of the frame, the other wheel being located near the center of the opposite side of said frame and constituting the only traction wheel, and separate plow supporting frames hinged to the frame to swing vertically at right angles to the line of draft.

3. In a motor plow, a truck-frame, and three supporting wheels only therefor, said wheels having their lower sides disposed in the same plane parallel with that of the frame, two of said wheels being upon the opposite ends of one side of the frame, the other wheel being mounted on the center of the opposite side of the frame and constituting the only traction means, means for turning the first-named two wheels laterally for steering purposes, and plow-supporting frames hinged to the frame to swing vertically and transversely of the line of draft and extending laterally some distance to the outside of the line of travel of the traction wheel when adjusted for use.

4. In a motor plow, a three-wheel truck in which two of the wheels are mounted upon opposite ends of one side of the main supporting frame to turn laterally for steering purposes, the other wheel being mounted upon the central portion of the opposite side of said frame and constituting the only traction means, the lower faces of said wheels being disposed in the same horizontal plane to travel upon the surface of the unplowed ground, and plow-supporting frames mounted for vertical movement upon opposite ends of the same side of the frame as the traction wheel and extending outwardly beyond the line of travel of said traction wheel.

5. In a reverse drive motor plow, a truck-frame having three supporting wheels only, two of the wheels being mounted upon opposite ends of one side of the truck-frame to turn laterally for steering, the other wheel being mounted upon the center of the opposite side of the machine and constituting the only traction wheel, and plow-supporting frames hinged to opposite ends of the truck-frame at the front and at the rear of the traction wheel to swing vertically and transversely of the line of draft of the machine, and separate devices for holding the plow-supporting frames in their elevated positions.

6. In a reverse travel motor plow, a truck frame having two steering wheels located at opposite ends of one side of the frame and separate plow-supporting frames located at opposite ends of the opposite sides of said frame and hinged to the frame to swing vertically transversely of the line of draft, and a single traction wheel mounted on the same side as and between the plow-supporting frames.

7. In a reverse travel motor plow, a truck frame having two steering wheels located at opposite ends of one side of the frame and separate plow-supporting frames located at opposite ends of the opposite side of said frame and hinged to the frame to swing vertically transversely of the line of draft, and a single traction wheel mounted on the same side as and between the plow-supporting frames and having its lower traction face disposed in substantially the same horizontal plane as that of the steering wheels.

In witness whereof I have hereunto set my hand this 1st day of May 1913.

LEWIS S. HAYES.

Witnesses:
 IRVING H. PALMER,
 E. L. THOMPSON.